United States Patent Office 3,377,320
Patented Apr. 9, 1968

3,377,320
PROCESS OF USING GERMANIUM DIOXIDE AS A POLYESTER CONDENSATION CATALYST
Gijsbertus J. Zoetbrood, Velp, Gelderland, Netherlands, assignor to American Enka Corporation, Enka, N.C., a corporation of Delaware
No Drawing. Filed Feb. 19, 1965, Ser. No. 434,090
Claims priority, application Netherlands, Mar. 3, 1964, 64—2,098
5 Claims. (Cl. 260—75)

ABSTRACT OF THE DISCLOSURE

A process for the preparation of polyesters of terephthalic acid and a glycol which comprises polycondensing a glycol terephthalate in the presence of amorphous germanium dioxide as a catalyst.

---

This invention relates to an improved method for the manufacture of filament and film-forming polyesters, and more particularly to an improved polycondensation catalyst for use in the manufacture of polymethylene terephthalates.

The highly polymeric polymethylene terephthalates are linear polyesters having great value as fiber- and film-forming material, and the use of the term "polymethylene" in this application is intended to include members of the alkylene series, e.g., methylene, ethylene, propylene. They are made by a polycondensation reaction utilizing a derivative of terephthalic acid which, under the influence of heat, is capable of a condensation reaction with itself. The derivative is in the form of a bis-(hydroxyalkyl)terephthalate. Several methods of forming the derivative are known. The most common commercial production of fiber-forming polyesters utilizes an ester-interchange reaction in which a glycol is reacted with a lower alkyl terephthalate compound. Polyesters can also be satisfactorily produced by direct esterification of a glycol with terephthalic acid or by reaction of an alkylene oxide with terephthalate acid. Each of the above methods produces a bis(hydroxyalkyl)terephthalate which is subsequently condensed under reduced pressure at a high temperature to produce a highly polymeric linear polyester.

To carry out the esterification and polymerization steps in a reasonable time, it is necessary to utilize catalysts which produce a rapid rate of reaction in the materials undergoing polymerization. Usually a different catalyst is used for the ester or ester-interchange reaction and the condensation reaction.

Numerous compounds are suitable as catalysts in the ester-interchange reaction. U.S. Patent No. 2,465,319 discloses many compounds which are suitable as ester-interchange catalysts and any of such compounds listed therein may be employed effectively as ester-interchange catalysts of the present invention. As polycondensation catalysts, various compounds have been suggested. The disadvantages found in the use of many catalysts are color degradation of the polymer, low degree of polymerization of the product, slow speed of polymerization, and degradation in the strength of the final product.

One such polycondensation catalyst utilized in manufacture of the polymeric polymethylene terephthalates is germanium dioxide ($GeO_2$). A disclosure of the use of this compound is found in U.S. Patent No. 2,578,660. In spite of the advantages mentioned in the patent with regard to the use of germanium dioxide as a polycondensation catalyst, germanium dioxide has not found application in large-scale production processes because its use is attended with drawbacks which have led to preference of other polycondensation catalysts in the preparation of thread-forming polyesters. Some of the disadvantages of germanium dioxide are discussed in U.S. Patent No. 3,074,913. This patent points out the disadvantages of insolubility of the $GeO_2$ and polymer haziness. The invention which is the subject of this patent utilizes germanium alkoxides to alleviate some of these conditions.

Attempts have also been made to improve on the use of germanium dioxide by adding additional compounds along with the basic germanium compound. French Patent No. 1,321,000 states that although germanium dioxide gives polymers of excellent color, the reaction rates obtained utilizing these compounds are unsatisfactory. The French patent proposes to increase the reaction rate by adding a small amount of an organic titanium compound which increases the rate of polycondensation but also increases the appearance of color in the polymer. The French patent offers a compromise solution which provides a better rate of polycondensation but produces a polymer having less favorable color than those prepared with the aid of the germanium dioxide catalyst alone.

Another, and perhaps the most important, drawback is found in spinning textile filaments and threads from polymers utilizing germanium dioxide as a condensation catalyst. The spinning apparatus is subjected to a rapid clogging during fiber production, particularly in the gauze pack located prior to the spinneret. As a result of this clogging, further spinning becomes impossible and the spinning apparatus must be constantly cleared of the clogged polymer during extrusion operations. Additionally, the threads spun utilizing germanium dioxide cannot be subjected to conventional drawing processes because they will break.

An object of this invention is to provide a novel polycondensation catalyst for producing rapid polycondensation rates and polyesters having excellent spinnability, superior clarity of color, and improved physical properties not heretofore found in the use of polycondensation catalysts.

Another object of the present invention is to employ, as a polycondensation catalyst, a particular type of germanium compound which will eliminate the disadvantages heretofore found in the use of germanium dioxide.

By the process according to the invention, highly transparent fiber-forming polyesters can be easily spun into threads and drawn by conventional methods by utilizing, as a polycondensation catalyst, amorphous germanium dioxide. The amorphous form of germanium dioxide makes it possible to produce a polymer in a given time while utilizing a considerably smaller amount of catalyst than that necessary when use is made of normal germanium dioxide or even antimony trioxide, heretofore thought to be the best condensation catalyst available.

Although the exact nature of the reaction which the amorphous form of germanium dioxide creates in the mixture is not known, the amorphous form surprisingly produces clarity of color, increased reaction rate, and excellent spinnability of fibers and filaments. Because of the increased reaction rate during the polycondensation step, additional organic titanium compounds are no longer necessary and the inherent discolorations accompanying them are avoided.

The polyesters prepared according to the invention are linear polycondensates which are substantially composed of terephthalate units. They may, however, contain smaller amounts of other units such as isophthalate, sebacate and adipate units. The glycols which may be used in preparation of the polymer may be pure or mixed polymethylene glycols or other glycols such as 1,4-di(hydroxymethyl) cyclohexane.

In the process, a glycol terephthalate is subjected to polycondensation. The glycol terephthalate may be a monoglycol or a diglycol terephthalate or a mixture of the two with low molecular polyesters of glycol and terephthalic acid. Preparation of the glycol terephthalate may be by any of the known methods previously mentioned. If the ester-interchange method of producing the glycol terephthalate is use, any of the ester-interchange catalyst compounds are suitable, e.g., oxides, organic or inorganic salts, and organometallic compounds of metals such as barium, calcium, cadmium, cerium, cobalt, iron, potassium, lanthanum, lithium, magnesium, manganese, sodium, lead, tin, strontium, titanium, zinc and zirconium. It is also possible to use combinations of the above-mentioned compounds.

The amorphous germanium dioxide may be added to the reaction mixture at any point prior to the polycondensation step. In cases where the starting compound for the polycondensation step. In cases where the starting compound for the polycondensation is formed by ester-interchange, the amorphous germanium dioxide may be added either together with the ester-interchange catalyst prior to formation of the low molecular glycol terephthalate or separately after such formation. Similarly, in direct esterification methods, the polycondensation catalyst may be added initially or at any convenient point during the condensation phase of the reaction.

Additional compounds may be added to the reaction mixture at any stage of the process without affecting the invention. Such compounds which might be added would be those which render the ester-interchange catalysts ineffective after the ester-interchange reaction, affect dye affinity of the polymer, influence melt viscosity of the polymer, increase the stability of the polymer, give the polymer a dull appearance, etc.

The amorphous germanium dioxide may be prepared in any known manner. One method of preparation which may be employed involves melting the normally tetragonal or hexagonal crystalline germanium dioxide at a temperature of above 1250° C. and then cooling the melt rapidly to room temperature.

The amount of amorphous germanium dioxide utilized may vary within wide limits. In general, the use of quantities smaller than 0.001% by weight, calculated on the amount of polymer, will hardly produce any noticeable effect. On the other hand, concentrations higher than 0.03% by weight are unnecessary because they produce little further increase in the reaction rate. It is preferred to choose an amount within the range of from 0.005 to 0.02% by weight. The following examples are intended to illustrate the application of the present invention but are not intended to limit the scope thereof.

Example I

A number of polycondensation reactions were carried out by subjecting 50 kg. of dimethyl terephthalate to ester-interchange with 40 kg. of ethylene glycol. The ethylene glycon terephthalate thus formed was subjected to polycondensation in the presence of various polycondensation catalysts. The results of employment of various catalysts are found in the table below. In all cases polycondensation was carried out at a temperature of 280° C. and under reduced pressure, the pressure at the end of the reaction being about 0.4 mm. Hg. The polymer obtained in each of the runs was spun into threads under conditions normally used for spinning polyethylene terephthalate and unless stated otherwise in the table below, the conditions in the different experiments were identical. The relative viscosity of the polymers obtained was determined by means of a 1% solution in metacresol at 25° C. and the values in the table expressed in percent by weight are percentages by weight of the polymer obtained.

| Run | Catalyst Ester-interchange Weight, percent | Catalyst Ester-interchange Compound | Catalyst Polycondensation Weight, percent | Catalyst Polycondensation Compound | Duration of Polycondensation (Minutes) | Relative Viscosity of Polymer | Color of Polymer | Spinning of the Polymer Output of Spinning Pump (g. min.) | Spinning of the Polymer Denier and Number of Filaments | Spinning of the Polymer Pressure Build-up in Spinning Assembly (kg./cm.²/hr.) | Spinning of the Polymer Drawability of the Yarn |
|---|---|---|---|---|---|---|---|---|---|---|---|
| 1 | 0.015 | Zn Acetate, 2H₂O. | 0.02 | GeO₂ hexagonal. | 220 | 1.64 | Colorless | 60 | 135/48 | 60 | Undrawable. |
| 2 | 0.024 | Mn Acetate, 4H₂O. | 0.02 | do | 240 | 1.64 | do | 20 | 45/18 | 12 | Do. |
| 3 | 0.024 | do | 0.01 / 0.01 | GeO₂ (hex) / Ti tetrapropylate. | 180 | 1.67 | Grayish yellow. | 60 | 135/48 | 40 | Do. |
| 4 | 0.024 | do | 0.01 | GeO₂ amorphous. | 185 | 1.67 | Colorless | 60 | 135/48 | 0 | Good. |
| 5 | 0.024 | do | 0.02 | Sb₂O₃ | 210 | 1.63 | Slightly grayish. | 60 | 135/48 | 0 | Do. |
| 6 | 0.024 | do | 0.01 | GeO₂ amorphous. | 390 | 1.82 | Colorless | 60 | 135/48 | 0 | Do. |
| 7 | 0.024 | do | 0.02 | Sb₂O₃ | 480 | 1.82 | Gray | 60 | 135/48 | 0 | Do. |

The results of runs 1, 2, and 3 show that polymer prepared with hexagonal $GeO_2$ was unsuitable for spinning purposes because a very high flow resistance built up in the spinning assembly, necessitating exchange of the assembly after very short operating periods (approximately two hours). Moreover, the threads obtained could not be drawn because they broke during drawing. In runs 4–7 inclusive, both amorphous germanium dioxide and the known catalyst, antimony trioxide, produced threads which were drawn without difficulty.

Comparison of runs 1 and 2 with 4 indicates that amorphous $GeO_2$ was a considerably more active catalyst than was hexagonal $GeO_2$ since the amorphous product, used in much lower concentration, produced a polymer of equal relative viscosity in a much shorter time. Comparison of runs 3 and 4 shows that amorphous $GeO_2$ gave a polymer of better color than the hexagonal $GeO_2$ used in conjunction with a titanium compound.

Comparison of runs 4 and 6 with 5 and 7, respectively, shows that amorphous $GeO_2$ gives a polymer having a viscosity equivalent to that utilizing twice the amount of $Sb_2O_3$ and that the high viscosity polymer has an absence of color when amorphous $GeO_2$ is used.

In all of the above runs utilization of amorphous $GeO_2$ gives results which are, in all respects, distinctly superior to those obtained using the regular crystalline form of $GeO_2$. In addition, amorphous $GeO_2$ is shown to be superior in both rate of reaction and absence of color in the polymer than the widely used antimony trioxide.

Example II

A mixture consisting of 800 kg. dimethyl terephthalate, 480 kg. ethylene glycol, 80 g. amorphous germanium dioxide and 168 g. manganous acetate (containing 4 mols crystal water) was prepared. The mixture was heated, while stirring, under atmospheric pressure for 200 minutes, and the temperature gradually increased from 165° C. to 220° C. The methanol liberated was removed.

As a dulling agent, a dispersion of 4 kg. titanium dioxide in 16 kg. ethylene glycol was added to the reaction mixture and the excess ethylene glycol distilled off at a temperature of 230° C.

The mass was then heated for 50 minutes to raise the temperature to 274° C., with the pressure being decreased to 1 mm. Hg. The temperature of the mass was then increased to 283° C. in 150 minutes and the pressure decreased to 0.4 mm. Hg.

A bright white polymer, having a relative viscosity of 1.66, was obtained and cast into a ribbon. The cooled ribbon was cut into chips which, after thorough drying, were spun at a temperature of 285° C. into a 300 filament tow. A number of such tows were assembled and drawn to 3.8 times their original length without difficulties. The drawn filaments had a linear density of 1.4 denier.

The tow was of excellent quality and was crimped, dyed and cut by the methods normally used for polyethylene terephthalate tows. The fibers thus obtained were of very good quality in all respects.

Example III

An amount of 2.5 g. amorphous germanium dioxide was added to 25 kg. of low molecular polyethylene glycol terephthalate, obtained by direct esterification of terephthalic acid with glycol. Details of the preparation may be derived from Example II of U.S. application Serial No. 309,388 filed September 17, 1963, now abandoned. The mixture was heated to 280° C. in an autoclave subjected to a vacuum. After 340 minutes the pressure in the autoclave decreased to 0.1 mm. Hg.

The polymer was then extruded into thick threads, which were immediately cooled in water and cut. The polymer chips, having a relative viscosity of 2.05, were remarkably free from color. After drying, they were spun and drawn to high-grade yarns having high tensile strength.

While specific examples of preferred methods embodying the present invention have been described above, it will be apparent that changes and modifications may be made therein without departing from the spirit of the invention. It will therefore be understood that the examples recited and the particular methods of procedure set forth above are intended to be illustrative only and are not intended to limit the invention.

What is claimed is:
1. An improved process of manufacture of fiber- and film-forming polymethylene terephthalates which comprises the step of polycondensing a bis - (hydroxyalkyl) terephthalate in the presence of amorphous germanium dioxide as a condensation catalyst.
2. A process as defined in claim 1 wherein the amount of amorphous germanium dioxide used ranges from 0.005 to 0.02% by weight, calculated on the weight of the polymer.
3. A process as defined in claim 1 in which the polymethylene terephthalate employed is polyethylene terephthalate.
4. A process for the manufacture of polymeric ethylene glycol terephthalate which comprises polymerizing monomeric glycol terephthalate in the presence of a catalyst of amorphous germanium dioxide.
5. A process as defined in claim 4 in which about 0.01% by weight of said catalyst, calculated on the polymer weight, is employed.

References Cited

UNITED STATES PATENTS

| 2,578,660 | 12/1951 | Auspos et al. | 260—75 |
| 2,820,023 | 1/1958 | Cavanaugh et al. | 260—75 |
| 3,074,913 | 1/1963 | Davies et al. | 260—75 |

FOREIGN PATENTS

| 1,321,000 | 2/1963 | France. |

WILLIAM H. SHORT, *Primary Examiner.*

L. P. QUAST, *Assistant Examiner.*